J. B. BANNON & N. C. RHODES.
BEAN SORTER.
APPLICATION FILED APR. 14, 1917.
1,251,735.
Patented Jan. 1, 1918.
2 SHEETS—SHEET 1.
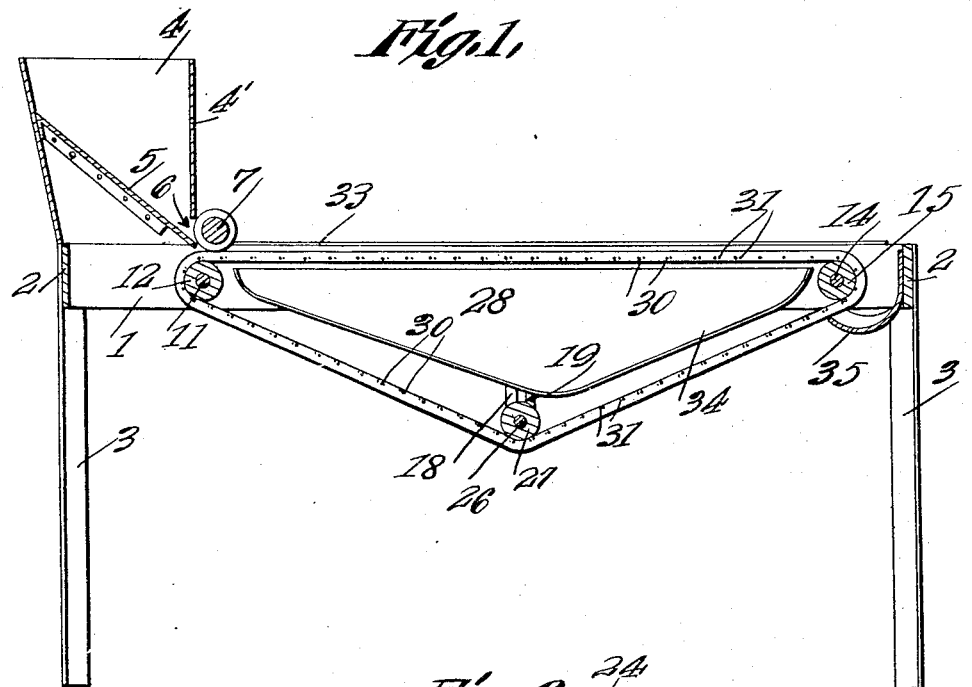
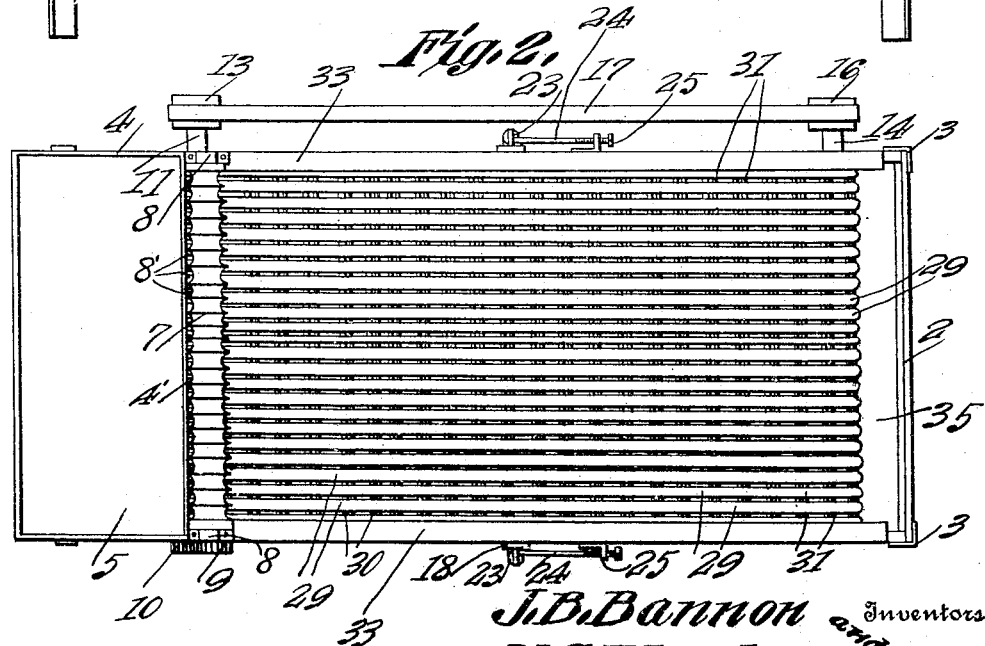
J. B. Bannon
N. C. Rhodes
Inventors
By C. A. Snow & Co.
Attorney
Witness

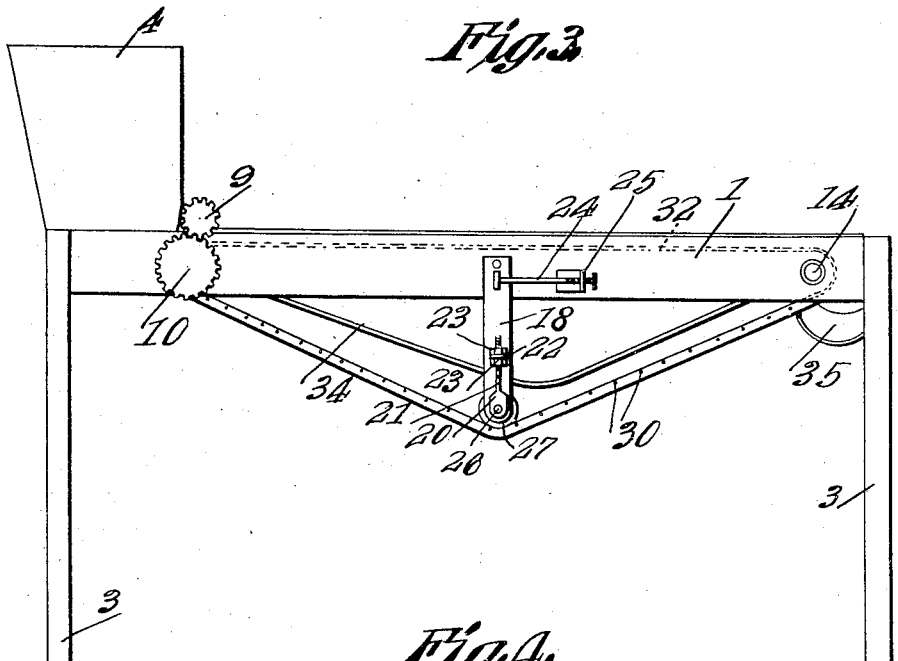
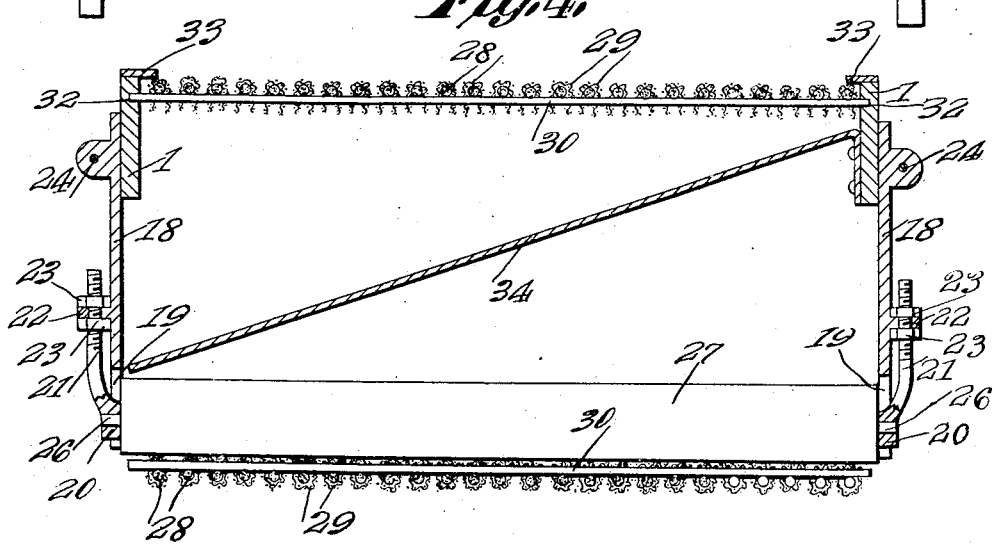

UNITED STATES PATENT OFFICE.

JOSEPH B. BANNON AND NAFE C. RHODES, OF GRAWN, MICHIGAN.

BEAN-SORTER.

1,251,735.

Specification of Letters Patent.

Patented Jan. 1, 1918.

Application filed April 14, 1917. Serial No. 162,095.

*To all whom it may concern:*

Be it known that we, JOSEPH B. BANNON and NAFE C. RHODES, citizens of the United States, residing at Grawn, in the county of Grand Traverse, State of Michigan, have invented a new and useful Bean-Sorter, of which the following is a specification.

This invention relates to a bean sorter wherein a rotary distributing roller coöperates with an endless carrier.

The main object of the invention is to provide a bean sorter which will quickly distribute the beans evenly in position to be sorted.

Another object is to provide an endless carrier that will hold the beans in position to be sorted and will permit the beans to be passed therethrough.

Another object is to provide means for collecting the sorted beans.

Another object is to provide means for adjusting the endless carrier.

Still another object is to provide a distributing feed roller.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings is shown one practical and preferred form of the invention.

In said drawings:—

Figure 1 is a longitudinal vertical section of a sorter constructed in accordance with our invention, the curved collecting plate being shown in elevation.

Fig. 2 is a plan view.

Fig. 3 is a side elevation.

Fig. 4 is a central, vertical transverse section.

Referring to the drawings by numerals:—

A rectangular frame, composed of side bars 1, and end pieces 2, is supported in the legs 3—3, and forms the main frame of the device. Secured to the rectangular frame at one end thereof, is a hopper 4, which rises from the frame and in which is an inclined wall or bottom 5. The lower edge of the wall 5 terminates below, and in spaced relation to the wall 4' of the hopper, thus forming a discharge slot 6 extending transversely of the machine. A distributing feed roller 7, turning in bearings 8 which are secured to the side bars 1, is positioned adjacent the discharge slot 6. The roller 7 has a series of adjoining, annular grooves 8', formed in its surface, which are adapted to receive the beans from the hopper and distribute them evenly to the endless carrier.

Secured to one end of the shaft of the roller 7, is a pinion 9 which meshes with a spur gear 10 which is secured to one end of the shaft 11 of a roller 12, which shaft is journaled in bearings in the side bars 1, and extends transversely of the machine and underlies the roller 7. The shaft 11 extends beyond one side bar 1, and to its outer end is secured a pulley 13.

Another shaft 14 is journaled, adjacent the other end of the machine, in bearings in the side bars 1, and carries, between the side bars, a roller 15. The shaft 14 extends beyond one side bar 1 and to its extending end is secured a pulley 16. A belt 17 passes over the pulleys 13 and 16, and forms the main driving means for the device.

A hanger 18 is pivotally secured to each side bar 1 and is formed with a longitudinal slot 19, adjacent its lower end. A bearing block 20 is slidably mounted in the slot 19, and has a threaded stem 21 which passes through an aperture formed in a bracket arm 22 which is secured to the hanger 18. Nuts 23—23 are adapted to the stem 21 and engage the stem above and below the bracket arm 22, for the purpose of adjusting the bearing block in the slot 19 and securing it in its adjusted position. An adjusting screw 24 is threaded in a bracket arm 25, which is secured to the side bar 1 and has its other end connected to the hanger 18, so as to adjust the hanger to a vertical position. A shaft 26 is journaled in the bearing blocks 20, and carries a roller 27 which extends transversely of the machine and underlies the rectangular frame.

An endless carrier passes over the rollers 12, 15 and 27 and serves to position the beans to be sorted. This carrier is constructed of longitudinal strands 28, preferably of cylindrical cords spaced apart. Over each strand is drawn a strip 29 of flexible material, such as cloth, which is bound to the strand by spaced wires 30, which are thrust through the edges of the strip, after the strip is drawn over the cord 28. Cords 31 are fastened at intervals to adjoining strips 29 for the purpose of retaining the strands in proper spaced relation.

A horizontal groove 32, extends longitudinally of each side bar 1, and within these grooves the ends of the rods 30 slide as the carrier travels. An inwardly projecting rib 33 is formed on the inner face of each side bar 1, at the upper edge thereof, to prevent beans from coming in contact with the side bar and being forced through the carrier or out of the machine.

Secured to the inner face of one side bar 1, and underlying the upper strands of the carrier, is a collector plate 34, which slopes inwardly and downwardly from the side bar 1 and is slightly concaved longitudinally. One of the free edges of the plate 34 is slightly longer than the other to form the delivery point slightly to one side, and out of the way of the hanger 18. This structure is shown most clearly in Figs. 1 and 3. Another delivery trough or gutter 35 is provided at the delivery end of the machine and is adapted to receive the beans which remain on the carrier and are carried over the roller 15.

The operation of the device is as follows:—Beans are placed in the hopper 4, from whence they will slide down the inclined bottom 5 to the opening 6 and roller 7. The operator pulls the belt 17, revolving the rollers 12 and 14 and carrying forward the carrier. At the same time, the distributing feed roller 7 will be revolved, through spur gear 10 and pinion 9, causing beans to be delivered through the grooves 8', which will distribute the beans evenly over the carrier. The operator then goes over the beans carefully, forcing the culls, by pressing thereon with his finger, through the strands of the endless carrier, and delivering them to the collector plate 34. The beans remaining on the carrier are carried over the roller 15, when the carrier is moved, and deposited in the trough 35 from which they gravitate to any suitable receiving receptacle.

Having described our invention, what we claim as new and desire to secure by Letters Patent, is:—

1. A sorter, comprising a frame, a hopper on the frame, an endless carrier in the frame consisting of spaced longitudinal strands, rods extending transversely of the strands, flexible connections between the rods and strands, and means for delivering from the hopper in rows between the strands.

2. A sorter, comprising a frame, a hopper on the frame, means for delivering from the hopper, and an endless carrier traveling in the frame and consisting of spaced longitudinal strands, flexible material placed over each strand, and rods piercing the free edges of the flexible material to bind the strand between the rods and the material, the said rods extending transversely of the carrier, and means for operating the carrier.

3. An endless carrier for sorters, comprising longitudinal strands, flexible material over each strand, and rods piercing the free edges of the flexible material to bind the strands between the rods and flexible material, said rod extending transversely of the carrier.

In testimony that we claim the foregoing as our own, we have hereto affixed our signatures in the presence of two witnesses.

JOSEPH B. BANNON.
NAFE C. RHODES.

Witnesses:
A. H. JONES,
H. B. JONES.

Copies of this patent may be obtained for five cents each, by addressing the "Commissioner of Patents, Washington, D. C."